United States Patent Office 3,629,272
Patented Dec. 21, 1971

3,629,272
PROCESS FOR PRODUCING 6-HALO-4-AZABENZ-IMIDAZOLES AND INTERMEDIATES THEREFOR
Henry Bader, Newton Centre, and John L. Ferrari, Framingham, Mass., assignors to Polaroid Corporation, Cambridge, Mass.
No Drawing. Filed May 1, 1969, Ser. No. 821,113
Int. Cl. C07d 31/42
U.S. Cl. 260—296 H                    9 Claims

ABSTRACT OF THE DISCLOSURE

Halo-substituted-4-azabenzimidazoles are prepared in two steps: (1) by the selective hydrogenation of a 2-amino-3-nitro-5-halopyridine in a solution of a high boiling alkanol using Raney nickel catalyst to yield the corresponding 2,3-diamine and (2) refluxing the alkanol solution of diamine intermediate with formic acid while continuously and simultaneously removing water of condensation.

---

This invention relates to an improved method of synthesizing halo-substituted 4-azabenzimidazoles and to the preparation of intermediates useful in the synthesis thereof.

Azabenzimidazoles, including halo-substituted compounds are known and have found utility in pharmaceutical applications and also in photographic applications where they have been used as antifoggants. Typically, 4-azabenzimidazoles are prepared in two steps from 2-amino-3-nitropyridines by reduction of the starting material to give the corresponding diamine followed by ring-closure effected by treating the diamine intermediate with formic acid to yield the final product.

Though various procedures have been used for preparing these compounds, they have been attended by certain drawbacks, mainly low purity of the end product and low or inconsistent overall yields. In one such procedure reported by Vaughan et al., J. Am. Chem. Soc., 71, 1885 (1949), 2-amino-3-nitro-5-chloropyridine was treated with sodium hydrosulfite to give the corresponding 2,3-diamino-5-chloropyridine which, after being purified, was reacted with formic acid to give 6-chloro-4-azabenzimidazole. Though the reported yield from the ring-closure step was 84%, the diamine intermediate was obtained in only a 34% yield giving an overall yield for the two steps of less than 30%.

In another procedure reported by Graboyes and Day, J. Am. Chem. Soc., 79, 6421 (1957), the reduction step was carried out with stannous chloride using bromo- rather than chloro-substituted aminonitropyridines as the starting materials. In their work, 2-amino-3-nitro-5-bromo-6-methylpyridine was reduced with stannous chloride in concentrated hydrochloric acid to give the corresponding diamine intermediate which, after purification, was refluxed with formic acid to produce 5-methyl-6-bromo-4-azabenzimidazole. While the yields reported for the reduction and ring-closure steps were 88% and 100%, respectively, attempts to reproduce either of these results in our laboratories were unsuccessful. Neither the diamine nor the azabenzimidazole were obtained in useful yields or sufficient purity to afford a practical method for manufacturing purposes.

It is the primary object of the present invention to provide a method of producing 4-azabenzimidazoles and the diamine intermediates of their synthesis in consistently high yields, and to provide such a method suitable for large scale production.

It is a further object of the present invention to provide a method of producing 4-azabenzimidazoles of satisfactory purity for use in photographic applications.

Further objects of the present invention will in part be obvious and will in part appear hereinafter.

The invention accordingly comprises the processes including the several steps and the relation and order of one or more such steps with respect to each of the others which are exemplified in the following detailed disclosure and the scope of the application of which will be indicated in the claims.

The invention addresses itself to three interconnected goals:

(1) To reduce selectively a halonitroamine to a halodiamine;

(2) To choose a reaction medium for the former such that it also may be used in the next step, so as to avoid decomposition of the very sensitive diamine during additional handling; and (3) To accomplish ring-closure in a quantitative manner in a medium so chosen.

According to the present invention, it has now been found that the diamine precursors for azabenzimidazoles may be obtained in consistently high yields by the selective hydrogenation of 2-amino-3-nitro-5-halopyridines using Raney nickel as the selective catalyst and an alkanol having a boiling point above about 115° C. as the solvent for the reaction. Also, it has been found that the azabenzimidazole end products likewise may be obtained in consistently high yields and purity by reacting formic acid with the diamine intermediate without first isolating and purifying the intermediate.

Such results are highly unexpected in view of the difficulties previously encountered in the selective hydrogenation of aromatic halonitro compounds generally. As discussed by Greenfield and Dovell, J. Org. Chem., 32, 3670 (1967), the selective hydrogenation of aromatic halonitro compounds to haloamines is difficult because reductive dehalogenation is enhanced by amino substitution in the ring. As pointed out by these authors, dehalogenation is known to occur with various catalysts including Raney nickel and takes place more readily with bromine than with chlorine-substituted compounds. These difficulties were also experienced in the present work when palladium or platinum catalysts were used. Side-reactions such as dehalogenation or ring reduction led to lower purity and yields.

In the present invention it was found that a Raney nickel catalyst gave selective hydrogenation provided that it is used in a suitable medium of an alcohol or an ester and at a temperature of 20–30° C. In the case of the production of benzimidazoles, however, the choice of the solvent is conditioned upon its being consistent with the goals (2) and (3), listed above.

Thus, though ethanol may be used quite successfully in the selective hydrogenation, the ethanol solution of the diamine could not be used directly in the ring-closure step, as it would produce, in the presence of formic acid, ethyl formate which, due to its low boiling point, would reduce the temperature of the ring-closing reaction and consequently result in lower yields. As will be seen later, azeotropic removal of water is also desirable in this latter step, and this would not occur at the boiling temperature of ethyl formate. The alcohol should be of sufficiently high boiling point that both the alcohol itself and its formate ester would be suitable for azeotropic removal of water in the ring-closure step.

With ester solvents, other problems were encountered. Ethyl acetate leads to some acylation of the amino groups, which give rise to a 2-methyl derivative of the azabenzimidazole upon ring-closure. This difficulty is obviated, using butyl formate, which procedure afforded upon refluxing 24 hours with formic acid a 65% yield of the benzimidazole; however, the insolubility of the diamine intermediate in butyl formate makes it more difficult to separate the catalyst from the intermediate before proceeding to the subsequent ring-closure step.

A further finding of this invention is that the ring-closure step is facilitated by a physical removal of water. Evidence was accumulated pointing to this reaction being one of equilibrium between the intermediate N-formyl derivative and the benzimidazole. The equilibrium is displaced towards a complete conversion to benzimidazole by removal of all traces of water produced during the condensation, i.e., by forming an azeotropic mixture with the reaction solvent.

It has been found specifically that the yield of the ring-closure step carried out without azeotrope was very low when 90% formic acid was used (the product being mostly the N-formyl intermediate). With 97–100% formic acid, without azeotrope, the yields were as high as 95% for the ring-closure step, when the reaction was carried out on a small scale using a very large excess (185 mole equivalents) of formic acid. Such excess of a reagent and high dilution are, however, not economical and a better solution had to be found to perform the reaction on a large scale. By introducing a water-removing device through an azeotrope formation the yield of the ring-closure step was performed at better than 95%.

Higher boiling alcohols such as n-butanol offer many advantages, such as, allowing the selective hydrogenation to proceed in substantially quantitative yields; allowing easy separation of nickel catalyst from the reaction solution of diamine intermediate after hydrogenation; and allowing ring-closure to proceed smoothly during refluxing with formic acid without the formation of undesirable by-products. The higher boiling alcohol also aids in driving the ring-closure reaction to completion by forming an azeotrope with the water released upon ring-closure thereby facilitating removal of the water as it is formed during the reaction.

For a fuller understanding of the nature and objects of the present invention, reference should be had to the following detailed description.

The starting materials used in the method of the present invention may be represented by the following formula:

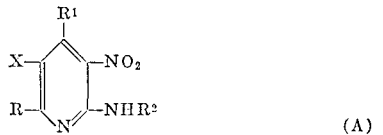

(A)

wherein R is selected from hydrogen, alkyl, aryl, aralkyl, amino, cycloalkyl and nitro; $R^1$ and $R^2$ each are selected from hydrogen, alkyl, aryl, aralkyl and cycloalkyl; and X is selected from bromo and chloro. Typical of the R, $R^1$ and $R^2$ substituents are methyl, ethyl, butyl, octyl, phenyl, naphthyl, benzyl, xylyl, p-ethylphenyl, cyclopentyl, cyclohexyl and cyclooctyl. Preferably, these substituents contain not more than about 12 carbon atoms.

In carrying out the present method, a solution of the above-defined 2-amino-3-nitro-5-halopyridine starting materials in an alkanol having a boiling point above about 115° C. are hydrogenated with a Raney nickel catalyst to form the corresponding 2,3-diamine intermediate which may be represented by the following formula:

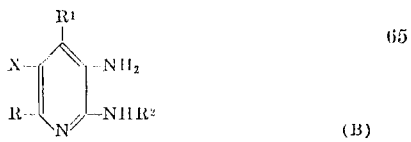

(B)

wherein R is selected from hydrogen, alkyl, aryl, aralkyl, cycloalkyl and amino and X, $R^1$ and $R^2$ are defined as in Formula (A) above.

After removing the nickel catalyst from the reaction solution, the resulting solution is refluxed with formic acid to produce the 6-halo-4-azabenzimidazole end product which may be represented by the following formula:

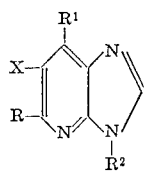

wherein X, R, $R^1$ and $R^2$ are defined as in Formula (B) above.

Specific diamine intermediates which may be prepared according to the present invention include:

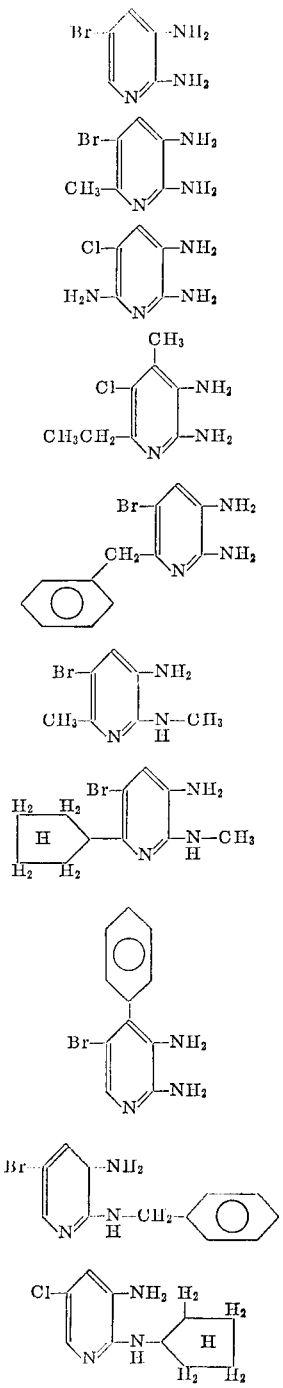

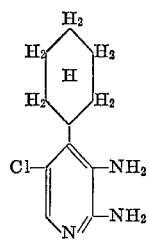

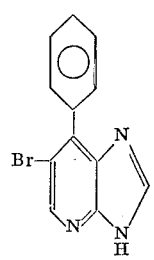

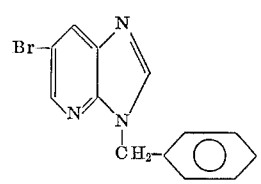

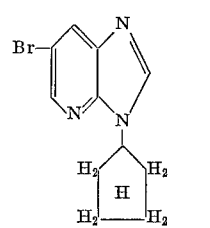

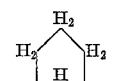

Specific 4-azabenzimidazole end products to be prepared according to the present invention include:

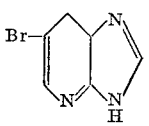

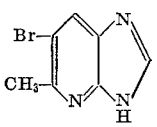

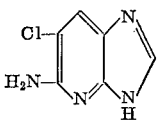

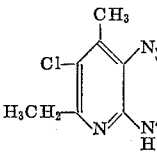

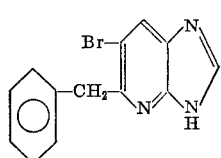

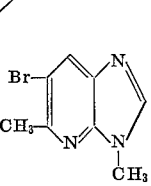

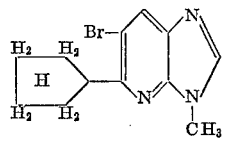

To achieve high yields in both the hydrogenation and ring-closure steps of the present method, the alkanol used as the solvent should have a boiling point above about 115° C. For this purpose, any of the higher boiling alkanols may be used, for example, n-butyl alcohol, isoamyl alcohol, n-amyl alcohol, n-hexyl alcohol, 2-hexanol, n-heptyl alcohol and 2-heptanol. The amount of alkanol used is not critical. Amounts between about 1.5 and 2.0 moles per 0.1 mole of starting nitroaminopyridine have been found satisfactory with additional quantities being added during refluxing if necessary to complete the removal of the water formed.

The Raney nickel employed as the selective catalyst is well known in the art and may be readily prepared in the usual manner from a nickel-aluminum alloy according to the procedure described in U.S. Pat. 1,628,190. In the present method, hydrogenation with this catalyst is conducted at ambient temperatures, i.e., about 20° to 25° C., though somewhat higher temperatures may be used if desired. Preferably, however, the temperature does not exceed about 30° C. in order to avoid dehalogenation or reduction of the ring.

After hydrogenation, the nickel catalyst is removed from the reaction solution which may be readily accomplished by filtering. The filtered solution is then refluxed with formic acid to yield the 4-azabenzimidazole end product. Because the reaction of the diamine intermediate with formic acid results in the formation of an N-formyl derivative which ring-closes to the imidazole, water of condensation should be continuously removed simultaneously with refluxing to drive the ring-closure reaction to completion. Otherwise, the azabenzimidazole will tend to be in equilibrium with the formyl intermediate which results in lower yields of ring-closed product. Also, it is preferable to use a catalytic amount of strong acid to enhance the rate of reaction. Any strong acid may be used including inorganic acids, such as sulfuric and hydrochloric acids or an organic acid such as p-toluenesulfonic acid. Since the water is azeotroped by the alkanol, it may be desirable to add additional alkanol to ensure complete removal of the water thereby driving the ring-closure reaction to completion. During refluxing, the temperature may vary between 70° C. and 160° C. and preferably is between 90° and 120° C. for obtaining consistently high yields.

The following example is given to further illustrate the present invention and is not intended to limit the scope thereof.

EXAMPLE

A mixture of 23.2 g. (0.1 m.) of 2-amino-3-nitro-5-bromo-6-methylpyridine in 125 g. of n-butanol (1.69 m.) and 15 ml. of Raney nickel was hydrogenated until the theoretical uptake of hydrogen was obtained which required about one-half hour. The reaction mixture was filtered into a 1-liter, one-neck flask which contained 150 g. (3.26 m.) of 98–100% formic acid and 0.2 g. of p-toluenesulfonic acid, and the bottle and catalyst were washed with small portions of a total of 50 g. (0.68 m.) of n-butanol, taking care that the catalyst was never allowed to be sucked dry. The orange-yellow solution was refluxed for 4 hours while removing the water which azeotroped using a Dean-Stark trap. Initial reflux temperature was between about 88° and 100° C. An additional 66 g. (0.89 m.) of n-butanol was then added and reflux was continued overnight, removing additional water formed. Solid product formed in the refluxing solvent; the mixture was distilled until only ⅓ the original volume remained, cooled, filtered and the crude product washed with 2× 20 ml. of n-butyl formate. The crude product was then dissolved in a water-acetone solution which was treated with charcoal and filtered. After the solution was evaporated, 17 g. of snow-white needles (melting range 208.5–209.5° C.) of 5-methyl-6-bromo-4-azabenzimidazole hydrate was obtained representing an overall yield of 79.8% by weight. The yield for the ring-closure step as determined by refluxing a measured amount of diamine intermediate in n-butanol solution with formic acid in the manner set out above was found to be in excess of 95% by weight.

As indicated above, azabenzimidazoles such as those produced in accordance with the present invention find utility in photographic processing. For example, these compounds may be used as antifoggants in diffusion transfer photographic processes as described and claimed in copending application Ser. No. 689,611 of Howard G. Rogers filed Dec. 11, 1967 now U.S. Patent No. 3,473,924 issued Oct. 21, 1969. Besides their use as intermediates in the preparation of azabenzimidazoles, the diamines prepared according to the present method may be used in the production of other end products, such as triazolopyridines. The latter compounds are disclosed in the aforementioned reference to Vaughan et al. as being useful as antifoggants and antibacterials and are disclosed as being useful as antimetabolites in the above-mentioned reference of Graboyes and Day.

Since certain changes may be made in the above method without departing from the scope of the invention herein involved, it is intended that all matter contained in the above description shall be interpreted as illustartive and not in a limiting sense.

What is claimed is:
1. A method of converting a 2-amino-3-nitro-5-halopyridine to the corresponding 2,3-diamine which comprises hydrogenating a solution of said 2-amino-3-nitro-5-halopyridine in an alkanol having a boiling point above 115° C. with a Raney nickel catalyst.
2. A method according to claim 1 which comprises the additional steps of removing the Raney nickel catalyst from the reaction solution; refluxing the resulting solution with formic acid and in the presence of a catalytic amount of a strong acid while continuously and simultaneously removing water of condensation; and isolating the product comprising a 6-halo-4-azabzenzimidazole.
3. A method according to claim 1 wherein said halo substituent of said pyridine is bromo.
4. A method according to claim 1 wherein said halo substituent of said pyridine is chloro.
5. A method according to claim 1 wherein said pyridine is 2-amino-3-nitro-5-bromo-6-methylpyridine.
6. A method according to claim 1 wherein said alkanol is n-butanol.
7. A method according to claim 1 wherein the temperature during hydrogenation does not exceed about 30° C.
8. A method according to claim 2 wherein the reflux temperature is between about 70° and 160° C.
9. A method according to claim 2 wherein said strong acid is p-toluenesulfonic acid.

References Cited

Ziegler, J. Am. Chem. Soc., vol. 71, pp. 1891–3 (1949).
Leese et al., J. Chem. Soc., London, pp. 4039–40 (1954).
Israel et al., J. Org. Chem., vol 24, pp. 1455–60 (1959).

ALAN L. ROTMAN, Primary Examiner

U.S. Cl. X.R.

260—296 R, 999